(12) United States Patent
Bar-on

(10) Patent No.: US 11,228,548 B2
(45) Date of Patent: Jan. 18, 2022

(54) ACTIONABLE DATA EMBEDDED INTO EMAILS FOR AUTOMATING ACTIONS OF AN EMAIL CLIENT

(71) Applicants: Atlassian Pty Ltd., Sydney (AU); Atlassian Inc., San Francisco, CA (US)

(72) Inventor: Noam Bar-on, San Francisco, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/865,956

(22) Filed: May 4, 2020

(65) Prior Publication Data
US 2021/0344633 A1    Nov. 4, 2021

(51) Int. Cl.
| G06F 15/16 | (2006.01) |
| G06F 9/54 | (2006.01) |
| H04L 29/06 | (2006.01) |
| H04L 12/58 | (2006.01) |
| G06F 3/0482 | (2013.01) |

(52) U.S. Cl.
CPC ............ *H04L 51/18* (2013.01); *G06F 3/0482* (2013.01); *H04L 51/22* (2013.01)

(58) Field of Classification Search
CPC ....................................... H04L 51/18
USPC .............................................. 709/206
See application file for complete search history.

(56) References Cited

U.S. PATENT DOCUMENTS

| 2007/0016636 A1* | 1/2007 | Boerries | G06Q 10/107 709/200 |
| 2009/0204903 A1* | 8/2009 | Edelen | G06Q 10/107 715/752 |
| 2011/0208592 A1* | 8/2011 | Golder | G06Q 30/02 705/14.66 |
| 2011/0276637 A1* | 11/2011 | Thornton | G06F 3/048 709/206 |
| 2014/0229853 A1* | 8/2014 | Cho | G06Q 10/20 715/752 |
| 2015/0200883 A1* | 7/2015 | Brotherston | H04L 51/08 709/206 |
| 2015/0350116 A1* | 12/2015 | Bhagwan | H04L 51/12 709/206 |
| 2016/0065511 A1* | 3/2016 | Ganin | H04L 51/063 709/206 |
| 2016/0323223 A1* | 11/2016 | Davis | H04L 51/22 |
| 2016/0323224 A1* | 11/2016 | Stein | G06F 40/18 |
| 2017/0060824 A1* | 3/2017 | Sunderland | G06F 40/205 |
| 2017/0214641 A1* | 7/2017 | Mishra | H04L 67/06 |
| 2017/0279754 A1* | 9/2017 | Fitzsimons | H04L 51/28 |
| 2018/0026923 A1* | 1/2018 | Cho | H04L 67/02 709/206 |
| 2019/0097961 A1* | 3/2019 | Kvalnes | H04L 51/28 |

* cited by examiner

*Primary Examiner* — Hamza N Algibhah
(74) *Attorney, Agent, or Firm* — Brownstein Hyatt Farber Schreck, LLP

(57) ABSTRACT

A system in which existing email protocols are leveraged to exchange information between two or more client devices. An email includes an embedded serialized object that comprises instructions to inform one or more behaviors of an email client application performed upon receiving the email or at a later time.

13 Claims, 11 Drawing Sheets ns to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

ACTIONABLE DATA EMBEDDED INTO EMAILS FOR AUTOMATING ACTIONS OF AN EMAIL CLIENT

TECHNICAL FIELD

Embodiments described herein relate to electronic mail and, in particular, to systems and methods for defining and leveraging protocols for embedding actionable information as a serialized object into an electronic mail message and, additionally, to systems and methods for performing one or more automated actions upon receiving a serialized object embedded within an electronic mail message received by a mail client application executing on an end-user electronic device.

BACKGROUND

Electronic mail ("email") is leveraged for a wide variety of personal and professional purposes. Some emails provoke a recipient to perform some action, such as saving an attachment, replying in a particular manner, scheduling or performing a non-email task, and so on. In many cases, however, recipients of action-provoking emails frequently receive a number of similar, related, or identical emails which, in turn, provoke the recipient to repetitively perform similar, related, or identical tasks.

Conventional email client applications often include rules engines that can assist email recipients with certain application-level organizational tasks (e.g., sorting messages, generating calendar events and reminders, and so on), but such applications are often unable to assist users (without substantial manual configuration and testing) with completing higher-order repetitive tasks, such as replying to emails with message-specific content, selecting appropriate recipients of a reply, opening an application or web address in response to receiving an email, and so on.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
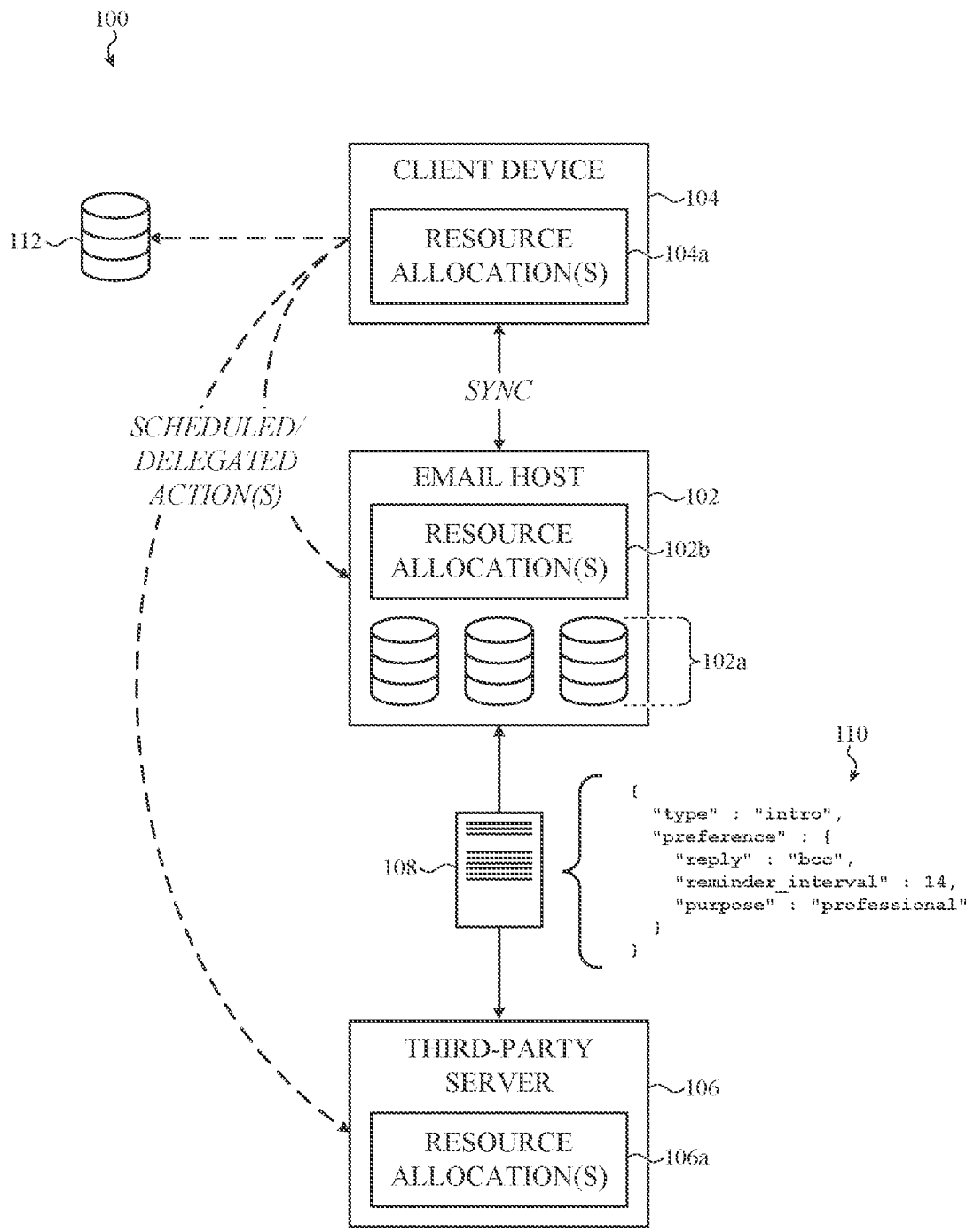
FIG. 1 depicts a system configured to send and receive emails that may include an actionable serialized object, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to exchange of information from a sender to a recipient via electronic mail messaging, and, in particular, to systems and methods for embedding information and/or actionable content into an email message (referred to herein simply as an "email").

Actionable content embedded into an email by the sender's email client can be extracted from that email by the recipient's email client and, in response, the recipient's email client can automatically perform one or more tasks or operations defined by that actionable, embedded content. In this manner, the sender of an email can define how that email is intended to be consumed or otherwise acted upon by the recipient, which may substantially improve the recipient's user experience and, additionally, may substantially increase the speed with which the sender's email is acted upon by the recipient. As a result of architectures described herein, both senders and recipients of email can exchange information and can act upon that information in a more efficient manner. Herein, information embedded in an email (e.g., within a header, within a body, within a subject field, within an addressee field, and so on) that can be used and/or parsed in order to trigger one or more automatic actions can be referred to as an "actionable serialized object" or more simply a "serialized object" embedded into an email. A serialized object as described herein refers to a data structure, memory object, or other computer-readable data item that has been converted ("serialized") into a string of bytes suitable to be stored, transmitted, or otherwise communicated between computing resources or shared between instances of software.

A serialized object embedded into an email, as described herein, can be automatically parsed and/or otherwise consumed at an end-user device (also referred to as a client device) to cause that device to perform one or more tasks or operations. This architecture allows for dynamic configuration of one or more behaviors of a first user's client device (e.g., a recipient of an email as described herein) according to preferences of a second user (e.g., a sender of an email as described herein), thereby facilitating richer and more customized device-to-device and/or person-to-person interactions by leveraging established and popular email protocols as a communication backbone and without requiring pre-configuration of either the first or second user's client device.

For example, in one embodiment, a serialized object embedded in an email (e.g., within a header, within a body, within a style sheet, or any other suitable location) sent from a sender to a recipient may be used by the sender to define how that message is displayed on the recipient's device. For example, the sender may prefer to hide the email message from the recipients inbox (so as to not clutter the recipients inbox), instead opting to generate a notification. This option may be leveraged by a sender when the sender only has a short message to convey that does not warrant (or solicit) a replay, such as "I have arrived." In such examples, the serialized object embedded into the email may include a flag, field, or other data item that indicates the message should only be displayed as a notification. In this manner, when the recipient's device receives the message, the serialized object can be extracted and the flag, field, or other data item can be parsed to inform an action of the recipient's device. In this example, the action performed in response to parsing the embedded serialized object includes two parts: (1) the message is hidden from the recipient's inbox and (2) a notification is generated including content extracted from the message and/or from the serialized object itself. In certain continuations of this example, the sender may opt to instruct the recipient's device via the embedded serialized object to play a particular sound, play a particular video, navigate to a particular URL, load a particular application, and so on. A person of skill in the art can readily appreciate that such examples are not exhaustive; any suitable action can be performed by a recipient's device in response to receiving an email including an embedded serialized object such as described herein.

For example, in other cases, an embedded serialized object may be used by a recipient's device to generate a graphical user interface. For example, a sender may send an email including an embedded serialized object that causes a recipient's device to display a survey when that email is opened. For example, the survey selections or choices may be predetermined responses to the sender's original email. By selecting a survey option, the recipient's device may automatically generate a reply email directed by to the sender including the selection made by the recipient. For example, the sender may send an email to a recipient asking where the two should go to lunch. The sender defines three choices of Restaurant A, Restaurant B, or Restaurant C. In this example, the recipient's device can extract the serialized object and parse information therein to generate a graphical user interface presenting the three options of Restaurant A, Restaurant B, or Restaurant C. In this example, the speed of interaction between the sender and the recipient is substantially increased. More specifically, the recipient need only make a single selection in order to provide a complete reply to the sender; the recipient is not required to spend time to draft a reply email, even a short draft email indicating the recipient's lunch preference.

In yet another example, an embedded serialized object may trigger several actions, some of which may be performed immediately, some of which may be scheduled to be performed at a later time, and some of which may be enqueued to be performed in response to occurrence of some defined event. Such serialized objects can be leveraged by senders and recipients of email alike to automate information exchange, follow-ups, and future messaging.

For example, in some cases, an individual (Person A) may wish to leverage email to introduce two personal or professional contacts (Persons B and C). Typically, Person A sends an email to both Person B and Person C. The email may include content describing each person's relationship to Person A, links to social or professional media, and so on. Thereafter, one or both of Person B or Person C may reply-all to thank Person A and to greet the other part. In certain cases, multiple emails may be generated, nearly all of which may clutter inboxes of Person A, Person B, and Person C.

The preceding example interaction can be substantially improved by leveraging actionable email serialized objects such as described herein. In particular, Person A may embed a serialized object that, without limitation: prevents Person A from being copied on any reply to Person A's message (e.g., Person A may only be added as a blind copy); schedules an automatic follow-up message to Person B and/or Person C in two weeks (or some other arbitrary time); prior to sending, causes Person A's device to automatically attach contact cards of Person B and Person C to the message; and so on. The serialized object may also generate a custom button on devices of Person B and Person C that sends a pro forma reply email back to Person A, thanking Person A for the introduction. The embedded serialized object may define that the pro forma reply is only shown to Person A as a notification.

In this example, Person A may select contacts for Person B and Person C and select a button labeled "Introduce." After selecting this button, Person A's device may automatically (1) generate a pro forma email body and subject line (e.g., by populating a template), (2) generate and embed a serialized object into that email that defines any replies back to Person A should show to Person A only as a notification and (3) send that email including the serialized object to each of Person B and Person C. The serialized object may also cause Person A's device to schedule at some future time a follow-up to Person B and Person C if Person A does not receive a reply email from either in a given time period. In this example, from Person A's perspective, only a single button press is required to (1) introduce two selected contacts and (2) schedule a follow-up to ensure that the introduction has been received.

When receiving this message from Person A, Person B's device may extract the embedded serialized object and generate a graphical user interface button labeled "Thank Person A." Upon selecting this button, Person B's device can automatically generate and send a reply email directed to Person A only that itself includes a serialized object that causes Person A's device to (1) show a notification and (2) hide the reply email from Person A's inbox.

Person B's device may also generate a graphical user interface button labeled "Schedule Meet-up with Person B." Upon selecting this button, Person B's device can automatically generate and send a reply only to Person C that itself contains an embedded serialized object including Person B's calendar availability for an upcoming time period, along with a listing of Person B's favorite coffee shops or restaurants. When Person C's device receives this message from Person B, it can extract the serialized object and generate a graphical user interface displaying Person B's calendar availability (which may be presented alongside Person C's availability), and providing one or more selectable elements each corresponding to a restaurant or coffee shop suggested in Person B's email. Upon making a selection, Person C's device can automatically generate a reply email back to Person B.

As may be appreciated by a person of skill in the art, in this example, a task of introducing two contacts via email, and receiving and consuming replies thereto, can be performed in a substantially automated manner, triggered only by a single button press initiated by Person A. From Person B's perspective, the task of thanking Person A requires only a single button interaction, and likewise the task of scheduling a meeting with Person C only requires a single button interaction. From Person C's perspective, the task of scheduling a meeting with Person B only requires a single selection of a meeting location.

A person of skill in the art may readily appreciate that actionable serialized objects as described herein can be configured and/or leveraged to automate and/or assist with multiple different personal or team workflows; these preceding examples above are not exhaustive.

More generally and broadly, embodiments described herein can be used to provide facilitate convenient interactions and data exchange between one or more persons, leveraging existing email sending and receiving protocols as a communications backbone. This technique has many benefits and advantages many of which are described below.

For example, in some embodiments, embedded serialized objects may be leveraged to, without limitation: to facilitate meeting scheduling (e.g., a first person engages a first button on their device to automatically determine a suitable meeting time, triggering a graphical user interface to render at a recipient soliciting a selection by the recipient of a suitable time and/or location); to facilitate file downloads or file exchange (e.g., a first person engages a first button to request a file from a second person, whose email client application automatically locates the file and attaches it to a response email); to facilitate multi-factor authentication (e.g., an embedded serialized object includes a cryptographic key used to access a service); and so on. More generally, it may be appreciated that a system as described herein can be configured to leverage email protocols and embedded serialized objects to communicably couple two or more end-user electronic devices. More specifically, end-user electronic devices executing instances of email client applications can perform functions, exchange information, launch applications, obtain sensor readings, initiate communication sessions (e.g., SIP), establish data communication channels (e.g., tunnels, secure shells, and so on), exchange cryptographic keys, and so on.

In further examples, embedded serialized objects as described herein can communicably couple multiple devices together. For example, an embedded serialized object send to a group of recipient addresses can instruct each device to launch a video conferencing software. In this example, a sender of a single email can automatically initiate a video conference with multiple participants without requiring those participants to manually launch specific software, enter meeting information or credentials, and so on. Such use cases may be of particular benefit to persons that are unfamiliar with particular technologies or how to leverage them. For example, an embedded serialized object sent to an email client of person with disability or a novice technology user can greatly improve that person's interaction experience with technology and, additionally, with the sender of the email.

In yet further examples, embedded serialized objects as described herein can communicably couple end-user devices together. For example, an embedded serialized object can include a cryptographic key such as an SSH key that causes an end-user device to reverse tunnel to the sender's end-user device. Such constructions can be leveraged by information technology support staff when debugging end-user issues.

In yet further examples, embedded serialized objects as described herein can be leveraged as a proxy. For example, an embedded serialized object can instruct a recipient device to access a web page, API, or service, and to return results of that access to the sender of the email.

In yet other examples, embedded serialized objects as described herein can be leveraged for parental or other administrative control purposes. For example, an embedded serialized object may instruct a recipient end-user device to generate a use report including information such as current network connections, application use, sensor outputs and so on. This information can be returned to the sender of the email.

More generally and broadly, as described herein, an end-user electronic device (also referred to herein as a "client device") can execute a email client application, configured as described herein, that extracts the embedded information and/or instructions (referred to herein as a "serialized object") and can cause the client device to perform one or more system-level and/or application-level functions (in sequence or in parallel, substantially simultaneously), automatically, and according to one or more instructions or data items defined in the serialized object.

As a result of these constructions, a sender of an email can inform and/or otherwise dictate (1) how that email is consumed by a target end-user, (2) how that email is consumed and/or processed by an end-user's electronic device, and/or (3) what function or functions a recipient electronic device can or should perform in response to receiving a message from that sender.

Example ways by which the manner an end-user consumes an email received by an email client application, such as described herein, can include, but are not limited to: suppressing display of an email from an email list (also referred to as an "inbox"); displaying an email in a different manner than other emails; displaying content of an email in a different user interface location, separate from the user's inbox (e.g., a tab or location dedicated to different message types, such as social media messages, software service notifications, shopping messages, and the like); and the like.

Example functions that can be performed by an email client application in response to receiving an email including a serialized object such as described herein include, but are not limited to: suppressing display of an email from an inbox and, instead, generating a native application notification formatted according to a serialized object extracted from the mail message; suppressing display of an email from an inbox and, instead, generating a native application notification with content defined by, or extracted from, a serialized object extracted from the mail message; displaying a received email according to, or otherwise informed by, a format definition extracted from a serialized object extracted from the email; displaying an already-received email or a set of already-received emails, according to, or otherwise informed by, a format definition extracted from a serialized object extracted from a newly-received email; and the like. Such tasks may be performed immediately and/or may be scheduled to be performed at a future time and/or may be enqueued to be performed in response to a particular event, such as receiving a particularly-formatted email or serialized object such as described herein.

Example functions that can be performed by an end-user client device, such as described herein, in response to an email client application executed by that end user client device receiving an email including a serialized object such as described herein include, but are not limited to: accessing a sensor (e.g., a gyroscope, an accelerometer, a global positioning system sensor, a battery level sensor, a camera or image sensor, a light sensor, an acoustic sensor, or an environmental sensor such as a temperature sensor, humidity sensor, hygrometer, barometer, air quality sensor, and so on) of the client device and obtaining a state or status of the sensor; performing an action with a haptic output element of the client device; performing a disk-level action (e.g., add a file, delete a file, move a file, and so on) outside of the context or sandbox of the email client application; and so on.

In further examples, multiple functions can be performed by the end-user client device in a workflow, program, or other order or sequence to confer additional benefits to the end-user beyond the convenience of simply receiving and consuming an email. For example, an end-user client device can determine its location in response to receiving an email (e.g., via a Bluetooth component, a Wi-Fi component, a global position system sensor, and so on). In these examples, the device's location can be used to inform or control how one or more actions defined in an embedded serialized object are undertaken. For example, an embedded serialized object may define that if an email is received when the recipient is at home, the email may be suppressed until a starting time of the following workday, at which time the recipient's email client may display the message.

In yet another example, an end-user device can be configured to leverage more than location data. For example, the device may be configured to automatically connect to a conference room's multimedia system upon receiving an invitation to a meeting in that conference room when the device is physically present within that conference room. In another example, and end-user device can be configured to determine whether the end-user is currently driving a vehicle and/or is using navigation software; for example, to determine whether the user is on his or her way to a meeting. In this example, a meeting cancellation message sent to the user may inform the end-user electronic device to interrupt navigation and to inform the user that the meeting to which the user is driving has been canceled and/or relocated to a different location. In the second case, the end-user device can be configured to automatically adjust the destination address based on content of the message received.

In yet other examples, one or more functions of an end-user electronic device can be delayed or enqueued until a sensor of the end-user electronic device transitions to a particular desired state. For example, an email related to a task the recipient of that message has to perform in a particular location (e.g., a trouble ticket to fix a particular piece of office equipment) can be sorted to the top of a message list when the end user is nearby that particular location. In one specific example, an information technology specialist may receive a number of messages on a daily basis each related to or associated with trouble tickets that require the user's physical presence in different locations.

In yet other examples, other sensors or systems of an electronic device that receives an email can be used. For example, internet requests for information can be initiated in response to receiving an email. As one example, if an end-user receives a message that is a receipt for a purchase, a request can be initiated to the credit card issuer such that the user's credit card balance may be shown. In another example, an application specific to the credit card issuer can be opened to a particular page (e.g., via deep-linking or another inter-application communication protocol).

The foregoing examples are not exhaustive; other systems or combinations of requests can be triggered and/or otherwise leveraged in response to receiving an email, such as described herein.

For simplicity of description and brevity, the term "email" can be used herein to refer to an email. An email is typically a file formatted according to, and/or otherwise compliant with, one or more protocols and is sent via the open Internet from a sender to a recipient.

More specifically, an email, such as described herein originates at first client device that generates and sends that email to a sender server, also referred to herein as a "third-party server" or "SMTP server" that communicably couples with an "email host" server associated with an email provider, of which the recipient of the email is a subscriber.

At a later time, a second client device operated by the recipient (herein, "end user" or "recipient") communicably couples to the email host and receives a copy of the email sent from the sender, which may also include metadata information such as message-identifying information and/or server identifying information. Such information, along with other email metadata included in the email received at the client device is referred to as "header" information.

More technically, each client device operated by an end-user may include a processor and a memory. The processor can be configured to execute program code and/or instructions stored in the memory to instantiate an instance of an electronic mail client application that, in turn, is configured to communicably couple to, and exchange information with, an email host server and/or an SMTP server. In these examples, the electronic mail client application can receive and/or otherwise process email messages stored on the email host server. Once a message is received or otherwise obtained by the electronic mail client application from the email host server, it may be referred to as the "received email message."

Once the electronic mail client application of the client device receives the received email message from the email host server, one or more processing services, functions, modules, or modes of operation of the electronic mail client application can be triggered. One or more of these processes can be configured to determine whether the received email message includes embedded information or, in another non-limiting phrasing, whether the received email message includes a serialized object such as described herein.

In many embodiments, a serialized object such as described herein can be inserted into a body and optionally hidden from view of the received email message and can be tagged or otherwise enclosed within custom tags, delimiters, or markup to signal to the electronic mail client application where the string value begins and where the string value ends. For example, in one embodiment, the received email message can have content formatted according to HTML protocol. In this example, a serialized object such as described herein can be enclosed in tags/markup that is compliant with the HTML protocol. For example, the serialized object can be enclosed between "<script>" and "</script>" tags. In other cases, the serialized object can be enclosed between entirely custom tags, such as "<custom-serialized object-tag>" and "</custom-serialized object-tag>." These are merely examples, a person of skill in the art may appreciated that a string serialized object, such as described herein can be suitably identified and/or otherwise extracted from a body portion of an email in a number of suitable ways.

Additional examples include, but are not limited to: a serialized object embedded between comment tags; a serialized object embedded in a script link; a serialized object embedded in a Cascading Style Sheet ("CSS") or link thereto; a serialized object embedded as an email header; a serialized object embedded as a data item within an existing or custom tag; a URL anchored to a remote serialized object or instruction set; and so on. For simplicity of description, the embodiments that follow reference a serialized object embedded between custom tags in an (at least partially) HTML-formatted email message body.

In many examples, a string value corresponding to a serialized object such as described herein conforms to a computer-readable and/or computer-parseable format, such as JavaScript Object Notation ("JSON) or Extensible Markup Language ("XML"). In other cases, the serialized object can be submitted as an attachment to an email message or embedded in an attachment to an email message. These example formats are not exhaustive, however, and it may be appreciated that in other examples other computer-readable formats may be considered and/or may be appropriate. For simplicity of description, the embodiments that follow reference a JSON-formatted string value that corresponds to a serialized object, such as described herein.

In view of the foregoing definitions and examples, it may be appreciated that a sender of an email message can utilize a graphical user interface to select one or more operations corresponding to selections of how the sender desires the serialized object to influence behavior of the email. In particular, the graphical user interface can be generated by or overlaid atop a graphical user interface of an email client application. Once the sender has completed his or her selections, the sender can indicate to the email client application that the email is ready to send. In response, the email client application can generate a serialized object corresponding to the sender's request(s), format that serialized object as a JSON string, enclose that string between custom HTML tags, insert the enclosed embedded string into a body of an email, and send the email to an intended recipient or set of recipients.

More specifically, the email client application can communicably couple to a third-party server to send/route/direct the email to the email host server. The email host server can thereafter, optionally, notify the client device of at least one recipient that a new email message is received and is ready for processing.

At a later time (e.g., after receiving a notification from the email host server or), the electronic mail client application, executed by the recipient's client device, can receive the email message from the email host server and can extract from a document object model ("DOM") of the HTML-formatted image, a JSON string corresponding to the serialized object from the received email message. Thereafter, optionally, the electronic mail client application can parse or otherwise convert the string value into a data object.

Once the electronic mail client application (of the recipient) has extracted the serialized object (and, optionally, converted a string value into a data object, or a set of data objects), the electronic mail client application can execute one or more instructions (also referred to herein as "action items") defined by the serialized object or, additionally or alternatively, the electronic mail client application can trigger one or more operations or tasks in response to content of the serialized object. In this manner, the serialized object defines one or more behaviors of the electronic mail client application.

For example, in one embodiment, an email can include a serialized object that includes an action item that causes the electronic mail client application to hide the email from an end-user's inbox. In this example, the serialized object can include a second action item that causes the electronic mail client application to generate a notification for the end user that may be shown immediately or at a specified time.

In many cases, content of the notification can be extracted from the serialized object (e.g., defined by the serialized object) or another location of email body. In some examples, a format, style, or multimedia content of the notification (e.g., such as an image shown along with the notification, such as a corporate logo), can be defined by the serialized object.

As a result of the constructions of this example, a sender of the email can define a recipient's consumption experience that is substantially different from a traditional email message. Namely, when the recipient receives a standard email message, it appears in an inbox of the client application alongside all other messages from other senders. In this example, the received email message is hidden from the recipient and, instead, only a notification is shown. In this manner, the recipient's inbox is uncluttered by the email message, but the recipient still receives important information that the sender desires to communicate.

In one specific example, the sender of an email message may be software service, such as a project tracking tool (also referred to as a "collaboration tool"). In these examples, as may be known by a person of skill in the art, the collaboration tool can be configured to generate email messages to notify users of the collaboration tool of information related to a project tracked by the tool. In conventional examples, a conventional collaboration tool may generate and send dozens of messages per day directed to the same recipient.

This quantity of email messages in an user's inbox may reduce the usefulness of the user's email by a substantial amount. Some further conventional email clients may be configured to allow for actions to be performed by a user from the email message itself, however, these conventional solutions either (1) only perform a single web request that may cause a client device to switch applications or for an end user to switch focus to a new pop-up window or (2) only perform an action that triggers an email to be sent from the end-user's account. In many cases, a user may not prefer to have unsolicited email sent on the user's behalf and/or the user may not prefer to have focus diverted in order to take action upon a task identified in an email message.

As such, continuing the example above, for embodiments described herein a collaboration tool can be configured to embed a serialized object with multiple action items such as described herein to simplify how the end-user consumes email messages from that collaboration tool. For example, the collaboration tool can configure actionable serialized objects to cause the recipients email client to hide all messages, instead directing data or information from those messages to a dashboard that summarizes a set of emails received from the collaboration tool, on or more statuses of one or more projects associated with the collaboration tool, and so on. In these examples, email may be leveraged as a data/notification service that feeds into a graphical user interface presenting one or more graphics that summarize status of higher-order tasks, projects, or other items.

It may be appreciated that the foregoing examples are not exhaustive. It may be appreciated that a serialized object, such as described herein, can be configured in any suitable way to trigger or otherwise cause any number of suitable tasks or operations to be performed by a client device, such as described herein. The serialized object can cause a client device to, without limitation: summarize certain email messages into a single email message delivered at a particular time of day (e.g., set by a user's preferences or by a serialized object or both); summarize certain email messages into a single notification that is displayed in a customized manner (e.g., with an icon defined by a serialized object, with emphasis or text formatting defined by the serialized object, with a size or shape or style defined by the serialized object and so on) and/or displayed to the user at a particular interval or at a particular time (e.g., set by a user's preferences or by a serialized object or both); aggressively notify a user that the email message has been received, by accessing one or more client-level notification devices, such as speakers, haptic elements, and/or other service; suppress all indications that a an email message has been received; preventing an email received from being stored; emphasizing or performing an action on another email message after receiving a first email message (e.g., a reminder message or follow-up message); generate a user interface ("UI") element according to a definition in the serialized object (e.g., button, slider, popup, text entry field, radio button, select button, and so on); associate an action to be performed by the client application in response to a user interaction with a particular UI element; schedule a task to be performed or an action item to be performed if the user does not perform an action within a particular time period; retrieve input from a sensor or other hardware component of the end-user device and send information retrieved therefrom to another component or system; and so on.

In further examples, a collaboration tool may send email messages to a user: each time a project assigned to the end user is updated; each time another user comments on something owned, authored, or under the control of the end user; at an interval with statistics describing the function or operation of a project in a given time period (e.g., how many users accessed a site or page on a particular day, how many unit tests are passing or failing, how many team members pushed commits to a particular project in a particular time period, and so on); and the like. In these examples, the collaboration tool can be configured to inject or embed a serialized object that triggers different behavior on the end user's device depending upon the type or kind of message sent by the notification service. For example, informational notices sent to the end user (e.g., statistics, notifications, and so on) may be presented in a different manner than actionable notices (e.g., surveys, approval emails, meeting invitations, voting, and so on). For example, information notices that are high priority may be suppressed from the user's inbox but may trigger the electronic mail client application to generate a high priority notification (e.g., along with a sound, a haptic alert, and so on). In these cases, informational notices that are low priority may be suppressed from the user's inbox but may trigger the electronic mail client application to generate a summary notification or email message once per day (or at another interval such as weekly, hourly, and so on) that summarizes content from all messages of that type received in a time interval. Similarly, informational notices that have a medium priority may be suppressed from the user's inbox but may trigger the electronic mail client application to generate a low-priority notification (e.g., lock screen notification, silent notification, and the like) that the email.

In other examples, a collaboration tool can create a serialized object that triggers actions based, at least in part, on the end-user's location when that user receives an email message. In a simple phrasing, in some examples, the collaboration tool can instruct the client's device to locate itself (e.g., by leveraging a global positioning sensor, by accessing Wi-Fi connection information, and so on) and, based on the location, determine whether additional action items should be performed. In a simple example, this construction can enable different behaviors for notifications or other action items based on whether the user is at work, whether the user is at a job site, or whether the user is not within a recognized area. In this manner, a user's work-related notifications or emails may be processed differently depending upon where the user is when the message is received. In another example, the serialized object can further cause the user's electronic mail client application to generate an out of office message in response to receiving a message when the user's client device determines that the user is not within a recognized location.

Similar to location information obtained from a user's client device, other outputs from other sensors can be obtained to inform other behaviors of the electronic mail client application and/or the client device. Examples include but are not limited to: providing different notification types depending upon ambient sound levels (e.g., high ambient sound triggers haptic alerts, whereas low ambient sound triggers audio alerts); providing different user interface elements or different user interfaces based on whether the user is driving (e.g., a global positioning sensor reports high speed); providing different user interface elements, different alerts, or different notification schemes based on a time of day or night; increasing or decreasing a reminder priority based on the user's location (e.g., suppress a reminder for a user to visit a file room if a Bluetooth module of the user's device reports that the user is within the file room); and so on.

As noted above, the foregoing examples are not exhaustive. To the contrary it will be appreciated that a serialized object such as described herein can be configured to define or leverage a Turing-complete programming language to trigger or cause to be triggered any suitable action or execution of code by a user's client device or by a user's electronic mail client application. In this manner, the embodiments described herein reference a defined format or protocol that can be leveraged by a sender of an email message and a recipient of an email message to convey additional information and/or to perform additional actions. In this manner, in a more simple and non-limiting phrasing, the embodiments described herein leverage popular and existing email communications protocols to confer additional functionality to a user that may provide the user with a more pleasant, a more organized, and a more useful email consumption experience. More broadly, embodiments described herein can leverage popular and existing email communication protocols to facilitate general communication between multiple end-user devices, whether such devices are owned and operated by the same person or different persons. Communications can include, but may not be limited to shell access, API access, sensor/hardware access, application access, and so on.

These foregoing and other embodiments are discussed below with reference to FIGS. 1-10. However, those skilled in the art will readily appreciate that the detailed description given herein with respect to these figures is for explanation only and should not be construed as limiting.

FIG. 1 depicts a system configured to transmit email messages to a recipient. An email sent via the system 100 can include an embedded serialized object such as described herein. In the illustrated example embodiment, the system 100 includes an email host server 102 which, in turn, is communicably coupled to both a client device 104 and a third-party server 106, also referred to herein as a sender server. The third-party server 106 can be further communicably coupled to another client device (not shown) from which the third-party server 106 can receive an email message such as described herein. In this architecture, the other client device (not shown) can be operated by a sender of the email message and the client device 104 can be operated by a recipient of that email. The third-party service 106, in this manner, is an email provider of the sender and the email host 102 is an email provider of the recipient.

More specifically, in many embodiments, the email host server 102 is communicably coupled to the third-party server 106 via one or more email message sending communication protocols, such as the Simple Mail Transfer Protocol ("SMTP"). Likewise, the sender's client device can be coupled to the third-party server 106 via SMTP. The email host server 102 is also communicably coupled to the client device 104, the recipient's client device, via one or more email message receipt communication protocols, such as the Internet Message Access Protocol ("IMAP"), the Post Office Protocol (e.g., "POP3"), or other protocols, such as Microsoft's Exchange/ActiveSync protocol.

As a result of this architecture, the third-party server 106 can generate and/or receive an email 108 that includes a serialized object 110, such as described herein, and can communicate the email 108 to the email host server 102 which may store the email 108 in a database, such as one of the databases 102a. In many examples, the email 108 is encrypted prior to being stored in the database, but this may not be required of all embodiments.

At a later time, the client device 104 (the recipient's client device) can submit a request to the email host server 102 to retrieve a copy of the email 108, served from one of the databases of the email host server 102. Thereafter, the client device 104 or more particularly a client application instance executed by the client device 104 can parse the email to extract an embedded serialized object, such as the serialized object 110, such as described herein. The serialized object 110 and/or its contents can be consumed by the client application of the client device 104 to perform and/or schedule one or more actions, such as described above or elsewhere herein. In some cases, the serialized object 110 can cause the client device 104 to perform a task involving the third-party server 106, the email host 102, or a remote database, such as the remote database 112. For example, the serialized object 110 can cause the client device 104, in some embodiments, to send another email message leveraging the third-party server 106 as an SMTP server. In other cases, the serialized object 110 can cause the client device 104 to send a reply email via the email host 102 (e.g., the email host 102 acts as an SMTP server). In yet other examples, the serialized object 110 can cause the client device 104 to submit a query to a remote database, such as the remote database 112. As one example, the remote database 112 may be a database associated with a collaboration tool, such as described above, storing as one example status of one or more projects tracked by a project management service of the collaboration tool. In this example, the serialized object 110 can cause the client device 104 to query the project management server for a status update on a particular project tracked by that tool. Thereafter, the results of the query can be displayed via a graphical user interface of the client device 104. In this architecture, the email 108 triggers an automatic workflow that informs the recipient of that email a current status of a project of interest to that recipient.

It is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, each server or service of the system 100 of FIG. 1 can be implemented in a number of suitable ways. As illustrated, the email host server 102, the third-party server 106, and the client device 104 each includes one or more purpose-configured components, which may be either software or hardware.

In particular, it may be appreciated that although these functional elements are identified as separate and distinct devices (e.g., servers) that can each include allocations of physical or virtual resources (identified in the figure as the resource allocations 102b, 104a, and 106a respectively), such as one or more processors, memory, and/or communication modules (e.g., network connections and the like), that such an implementation is not required. More generally, it may be appreciated that the various functions described herein of a host server 102 can be performed by any suitable physical hardware, virtual machine, containerized machine, or any combination thereof.

The foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, as noted above, it may be appreciated that a serialized object embedded in an email can be leveraged for a number of purposes, some of which may invoke or provoke action by a recipient of email, some of which may be performed completely automatically and in the background.

Generally and broadly, FIGS. 2-6B are presented herein to illustrate several discrete example embodiments of systems described herein. In particular, each figure illustrates a client device that may be configured to render a graphical user interface defined, at least in part, by an instance of an email client application configured to generate and/or parse embedded serialized objects as described herein.

Although each of these figures illustrates an example client device as a desktop computer, it may be appreciated that this is merely one example. In other configurations and/or architectures, other electronic devices can be used including mobile devices, tablet devices, and wearable devices.

In addition, these figures follow an example use case involving three parties, each leveraging a respective one instance of an email client application on a respective one client device.

More specifically, FIGS. 2-6B follows an example interaction in which a first user leverages systems and methods described herein which, in turn, operate over existing an popular email communication protocols, to facilitate an introduction between a second user and a third user. As noted above, this example contemplates that the first user leverages a first client device executing a first instance of an email client application, the second user leverages a second client device executing a second instance of an email client application, and the third user leverages a third client device executing a third instance of an email client application. In some embodiments, each of the client devices may be the same type or class of electronic device (e.g., laptop computers), but this is not required. In other examples, each individual user may leverage a different class of electronic device. Similarly, in some embodiments each email client application may be a separate instance of the same client application, but this is not required. In other examples, different client applications (e.g., supported and/or developed by different entities) may be used.

Absent the advantages of systems described herein, the example interaction between the first user, second user, and third user in which the first user introduces the second user to the third user is a substantially manual process. Human error, tone misinterpretation, and response latency may prevent or delay the introduction intended by the first user between the second and third users. For example, by leveraging email in a conventional manner, the first user may reach out to both the second user and the third user to mutually introduce the two. In some circumstances, the second user and/or the third user may not readily notice the email from the first user and may have a delayed response; this may be interpreted by one or more users as rude or unprofessional behavior. In other examples, one or both of the second user or the third user may reply all to the introduction message, thereafter copying the first user to unnecessary planning emails exchanged between the second user and the third user. In still other examples, the first user may forget to follow up on his or her original message.

Embodiments described herein can be leveraged to substantially automate and/or normalize the communications between the first user, the second user, and the third user to facilitate a quick and efficient interaction between all three users. In particular, as noted above, the example interaction described in reference to FIGS. 2-6B follows the mutual introduction between the second user and the third user, initiated by the first user.

More specifically, the first user initially uses a graphical user interface (e.g., by selecting a button thereof, by accessing a menu item thereof, and so on) of the first client application to indicate that the first user intends to send an email with an embedded serialized object that facilitates an introduction between two persons. In response, the first client application generates a graphical user interface which the first user can use to select two or more persons to introduce. The first user can leverage this graphical user interface to select the second user and the third user. As one example, the graphical user interface may communicably couple (via a suitable API) to a contact directory, social media service, or professional media service. Thereafter the first user can select a graphical user interface button or other selectable item indicating that the first user has completed his or her selections and desires to proceed with mutually introducing all selected persons.

In many embodiments, the first client application can be further configured to generate a body and/or a subject of the email into which the serialized object is embedded. For example, the first client application can be configured to select from a set of introduction email templates a single email template. The selected email template may be selected and/or edited by the first user via the graphical user interface, although this is not required.

In response to these above-described selections, the first client device or, more particularly, the first client application can generate a serialized object and embed that serialized object into the body of an email to be sent to the second user and the third user. As noted above, the email may be drafted in whole or in part by the first user, whereas in other cases, the email is selected from a template. Once the email body/subject is selected, a serialized object such as described herein can be embedded therein.

The serialized object can be configured to provoke a number of selected behaviors at the second and third client applications. For example, in some embodiments, the serialized object can be configured to prevent the first user from being added to a reply-all message. More specifically, the serialized object can limit the second or third client applications such that if either the second or third user attempt to reply all to the email message, the first user's email address will be omitted or, in some cases, added only to a BCC address field.

In other cases, the serialized object can be configured to cause the second and third client applications to communicably couple and to share geographic location information, calendar information, contact information, or any other suitable information. Such information sharing between the second user and the third user can help facilitate a quick and efficient introduction between them.

In yet other examples, the serialized object can be configured to cause the second and/or third client applications to generate or customize a graphical user interface providing supplemental options or features to the second or third users. For example, in one embodiment, the serialized object can define that a "thank you" button should be rendered in the second or third client applications. After clicking the "thank you" button, an email message can be automatically generated and sent to the first user, as a reply. The reply email can be selected from a set of template emails including content thanking the first user for facilitating the introduction. In some examples, the reply email generated in response to engaging the "thank you" button can itself include an embedded serialized object that causes the first client application to show only a notification to the first user.

These preceding examples are not exhaustive of the behaviors that may be provoked or leveraged by a system as described herein. As such, and to facilitate a thorough understanding of one example interaction use case in which various user may share data, and/or more efficiently interact, by leveraging embedded serialized objects, FIGS. 2-6B are provided below.

Figure 2:
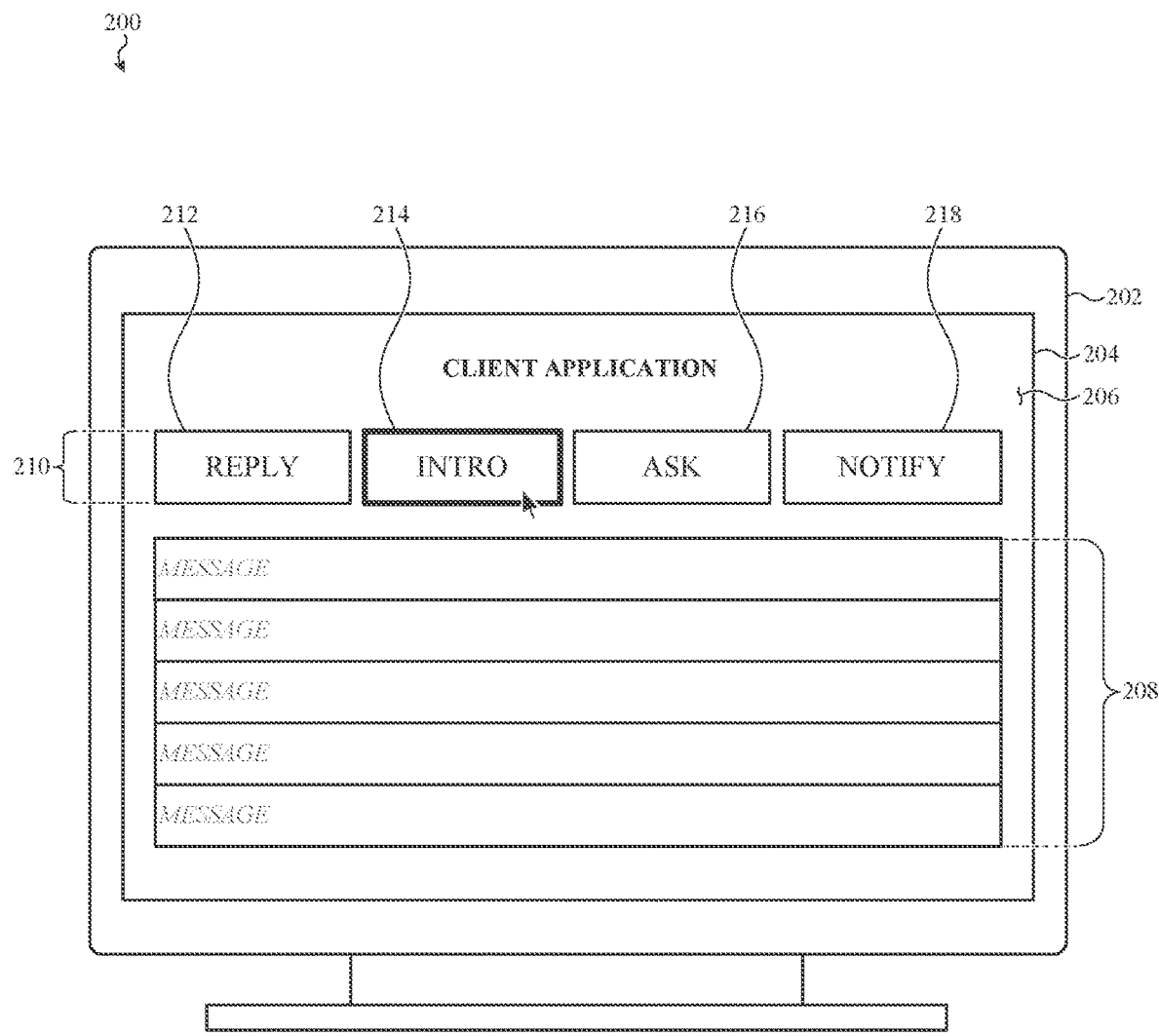
FIG. 2 depicts an example client device executing an instance of an email client application configured to embed an actionable serialized object into an email, such as described herein.

FIG. 2 depicts an example client device executing an instance of an email client application configured to embed an actionable serialized object into an email, such as described herein. In particular, a first client device 200 includes a housing 202 that encloses and supports a display 204. The display 204 can be leveraged by an instance of an email client application to generate a graphical user interface 206.

As noted above, the email client application (or, more simply, a client application) can be defined by executable code or instructions stored in a persistent memory of the first client device 200. A processor of the first client device 200 can be communicably coupled to the persistent memory and can access the persistent memory to load at least a portion of the executable code or instructions into a working memory in order to instantiate the client application. For simplicity of description, an instantiated client application is referred to herein, simply as a client application. For simplicity of illustration, the first client device 200 is depicted without a processor, a working memory, or a persistent memory; it may be appreciated however that such components (also referred to as resource allocations with reference to FIG. 1) may be included within the housing or in another location.

The graphical user interface 206 rendered by the client application is configured to present information related to emails received by a user of the first client device 200. For example, the graphical user interface 206 can present a message list 208 and/or one or more actionable buttons 210. The message list 208, also referred to as an inbox, can display condensed information about messages recently received by the client application. The actionable buttons 210 can be leveraged by the user to instruct the client application to perform one or more tasks, some of which may include generating and/or embedding a serialized object into an email draft. For example, as shown the actionable buttons 210 include a reply button 212. The reply button 212 may be selected by a user in order to reply to a sender of a message received by the client application.

The actionable buttons 210 can also include an introduction button 214, which may be selected by a user in order to generate a message, such as described above, that includes an embedded serialized object configured to facilitate a mutual introduction between two or more selected recipients of the message. Examples of actions that may be performed, triggered, scheduled, delegated, or provoked by an embedded serialized object associated with the introduction button 214 include but are not limited to: limiting to whom the email message may be forwarded; defining an encryption protocol or public key for use when reading or responding to the message; defining a particular SMTP server that should be used when responding to the message; setting a reply-to field of the message or any reply message; requiring at least one contact card attachment before a reply to the message can be sent; enforcing spellcheck before the message can be sent; accessing or sharing a calendar availability; and so on. It may be appreciated that these examples are not exhaustive; an introduction button as described herein can be associated with and/or can cause the embedding of a number of serialized objects.

The actionable buttons 210 can also include an ask button 216, which may be selected by a user in order to generate a message, such as described herein, that includes an embedded serialized object configured to cause a recipient electronic device/client application to render a graphical user interface with a limited set of selectable options. This button may be used to solicit a quick answer to a question, thereby improving the speed with which an email reply can be generated. For example, when a user presses the ask button 216, the client application may be configured to generate a user interface through which the user can add one or more predetermined responses to a question that the user desires to ask of the intended recipient of the email. For example, if the user intends to direct an email to a recipient asking whether to reschedule or cancel a meeting, the user can leverage the graphical user interface of the client device to add two predetermine responses. A first response reads "Cancel the meeting" and a second response reads "Reschedule for a later time." Each of the first response and the second response can be added to a serialized object that can be embedded into an email sent to the recipient. Upon receiving the message, with the embedded serialized object, the recipient's client application can render a graphical user interface including only two selectable items—a first item reading "Cancel the meeting" and a second item reading "Reschedule the meeting." By selecting one of these two options, the recipient can quickly respond to the sender's original message. In this manner, the sender of the message (e.g., a user of the client device 200) can quickly solicit a response from a colleague, supervisor, client, vendor, or any other suitable person. These example embodiments can dramatically increase the speed with which information is exchanged between individuals via email.

The actionable buttons 210 can also include a notify button 218, which may be selected by a user in order to generate a message, such as described above, that includes an embedded serialized object configured to generate a notification, instead of displaying a message within the message list 208.

Figure 3:
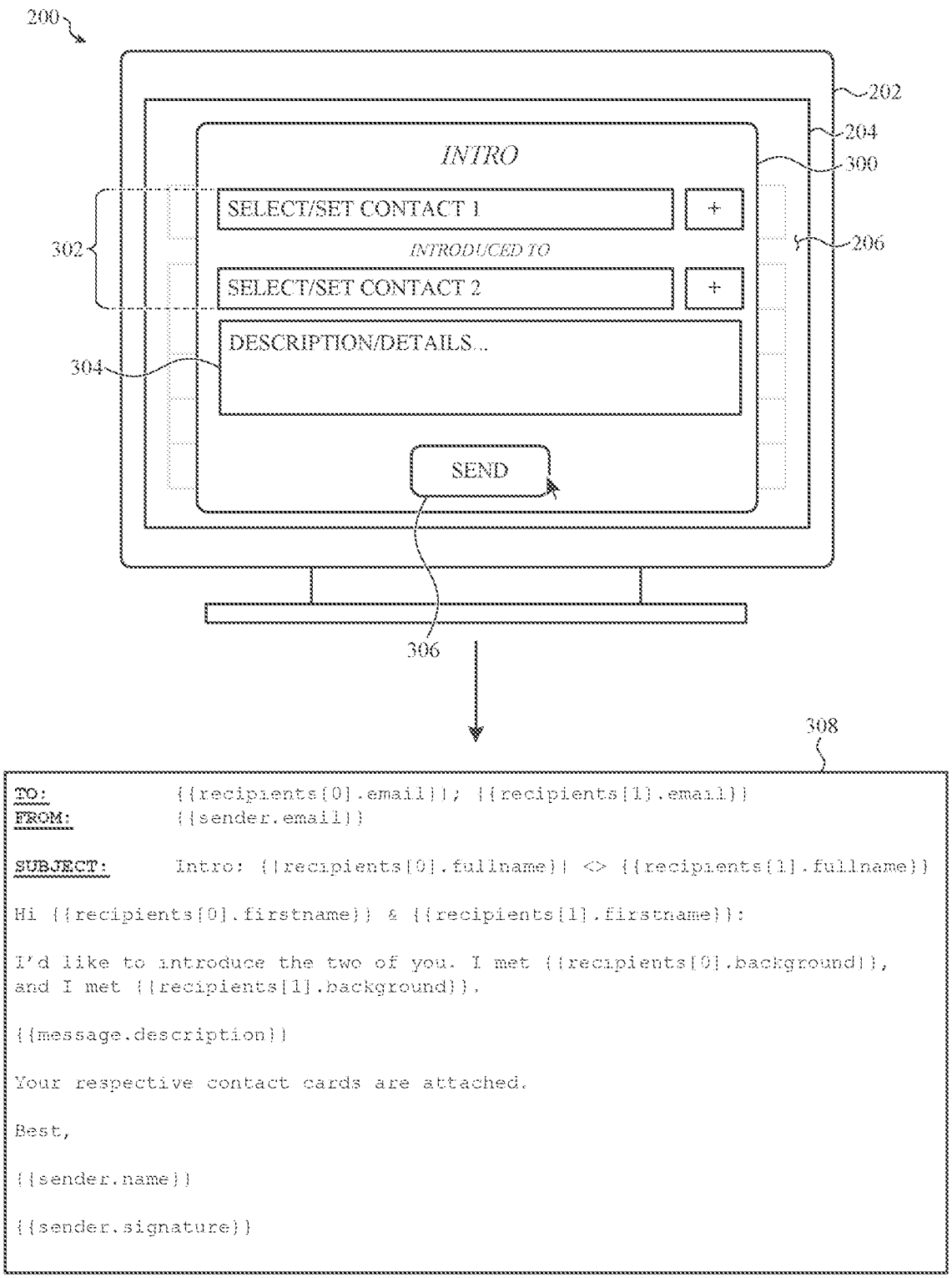
FIG. 3 depicts the client device and email client application of FIG. 2 displaying a graphical user interface configured to solicit user input leveraged to generate an actionable serialized object to embed into an email prior to sending.

In the illustrated embodiment, the introduction button 214 is selected by a user, indicating a user intent to introduce at last two contacts to one another. FIG. 3 depicts the client device and email client application of FIG. 2 displaying a graphical user interface configured to solicit user input leveraged to generate an actionable serialized object to embed into an email prior to sending. In particular, the first client device 200 (including, as noted above, a housing 202, a display 204 and a graphical user interface 206 rendered by a client application), after having received input from the user selecting the introduction button 214 (shown in FIG. 2), can display an overlay graphical user interface, shown in the figure as the graphical user interface 300.

The graphical user interface 300 can be specifically tailored to display options, parameters, and selections available to the user when facilitating an introduction. For example, as shown the graphical user interface 300 can include a contact selection region 302 that can be leveraged by the user in order to select or add contacts for mutual introduction. In addition, the graphical user interface can include a description area 304 that can be used by the user in order to add additional context, such as a description of how the user is connected with each of the selected contacts identified in the contact select region 302. Once information has been added to the user's satisfaction, the user can press a send button 306 that, in turn, will send an email 308 with an embedded serialized object (not shown), such as described herein. The email 308 may be selected from a set of templates, and may include fields that can be populated with information derived from or otherwise extracted from the user's inputs to the graphical user interface 300, such as email addresses of the selected contacts, names of the selected contacts, the first name and/or signature of the sender/user, background information describing a relationship between the user and one or more of the contacts, and so on. It may be appreciated that the foregoing example user interface elements are not exhaustive of the various types of elements that may be included in the graphical user interface 300—in other embodiments, additional (or fewer) user interface elements may be shown.

Figure 4A:
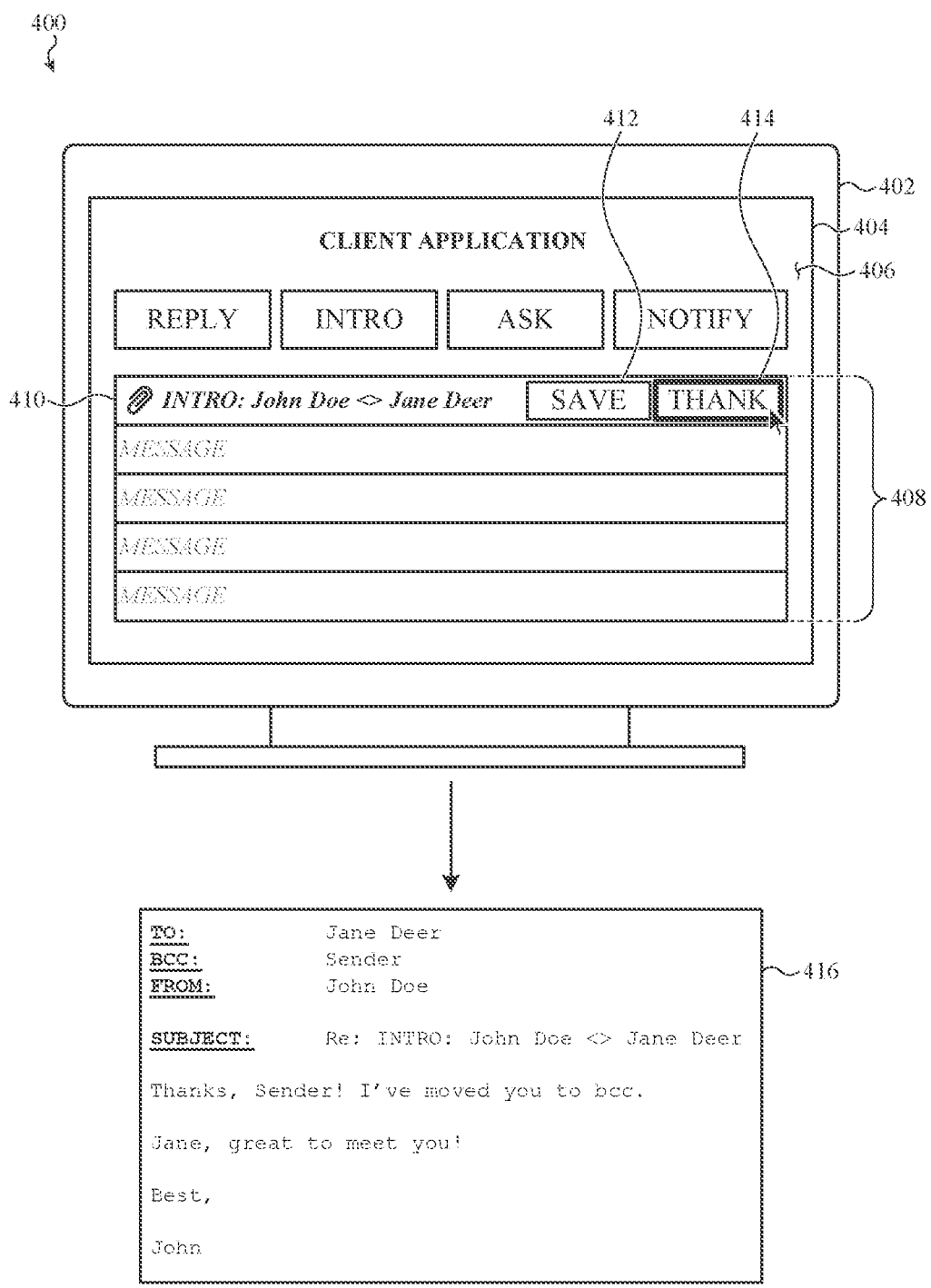
FIG. 4A depicts another client device executing an instance of an email client application having received the email of FIG. 3 and, in response, perform one or more actions defined by the actionable serialized object, such as generating an automated reply email.

As noted above, the client application may of the first client device 200 can generate a serialized object to define one or more actions that can be performed by a recipient's (e.g., each of the contacts selected by the user from the graphical user interface 300) client application. For example, FIG. 4A depicts another client device, a second client device 400, executing an instance of an email client application having received the email 308 shown in FIG. 3 and, in response, performing one or more actions defined by the actionable serialized object, such as generating an automated reply email and/or generating a graphical user interface element.

In particular, much like the first client device 200, the second client device 400 can include a housing 402 enclosing and supporting a display 404 that, in turn, can be leveraged by a processor, memory, and an instance of a client application to render a graphical user interface 406. The graphical user interface 406, as with the embodiment depicted in FIGS. 2-3 can include a message list, identified as the message list 408. In the illustrated embodiment, the email 308 sent by the first client device 200 is shown as the email 410.

The email 410 includes an actionable serialized object, which as noted above may be embedded into an HTML body of the email 410. In this example, the actionable serialized object sent from the client application of the first client device 200 (see, e.g., FIGS. 2-3) can cause the client application of the second client device 400 to render two additional, custom, user interface elements. In particular, as shown two additional user interface elements are shown atop the email 410 within the message list 408. It may a be appreciated, however, that this is merely one example implementation and that in other examples, another graphical user interface element or modification can be made.

In this example, two buttons are shown overlaid the email 410. In particular, a first button 414 is shown as a save button 412 which, when selected by a user of the second client device 400, can save the email 410 and/or an attachment thereof (such as a contact card of another copied recipient of the email 410) to a predetermined or selectable location.

The graphical user interface 406 is also modified by the actionable serialized object embedded in the email 410 to generate a thank button 414. The thank button 414 can be used by a user to automatically generate an email 416, which may be defined and/or selected at least in part by the actionable serialized object embedded within the email 410. The email 416 can be populated with content extracted from or identified by the actionable serialized object embedded in the email 410. In addition, the email 416 can populate CC and BCC fields based, at least in part, on instructions provided by the actionable serialized object embedded in the email 410. For example, as shown, the email 416 is not a reply message to the email 410, but rather the client application of the second client device 400 automatically adds the sender (the user of the first client device 200) of the email 410 to a BCC field, leaving only other recipients of the email 410 in the CC field. This action of moving the sender to the BCC field can be defined by the actionable serialized object as generated by the client application of the first client device 200, as shown in FIGS. 2-3. In this manner, more generally and broadly, serialized objects sent between different end-users can be chained, linked, derived from one another, or may build upon one another to architect a request-response system in which a first client device sends a request (e.g., an email with a first serialized object) to a second client device which returns a response (e.g., a reply with a second serialized object). In other cases, the first or second devices may generate response to a third electronic device via email or another communication channel.

Figure 4B:
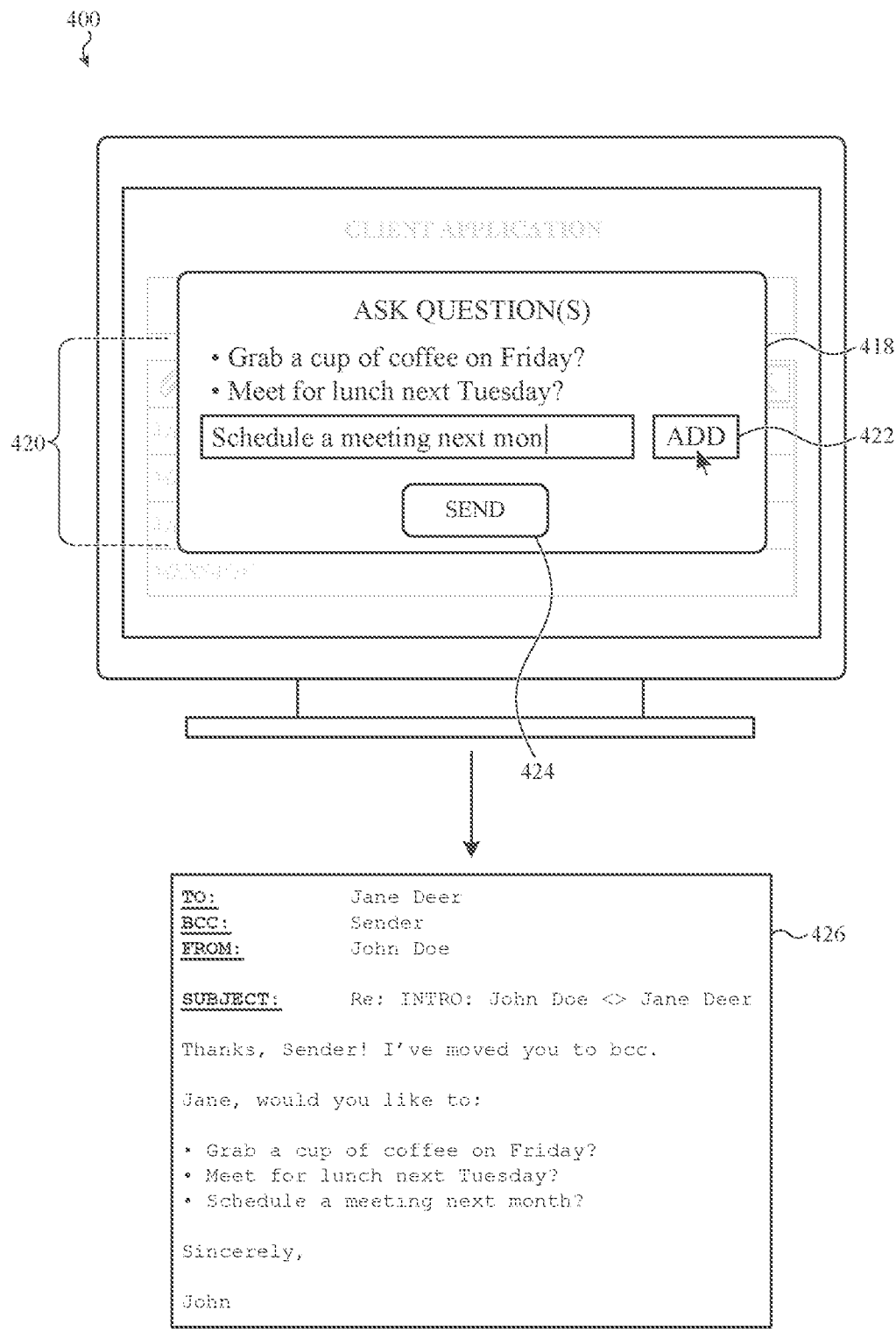
FIG. 4B depicts the example client device and email client application of FIG. 4A, the email client application displaying a graphical user interface configured to solicit user input leveraged to generate an actionable serialized object to embed into another email prior to sending.

In other examples, the user of the second client device 400 may additionally or alternatively desire to directly coordinate with other recipients of the introduction email, the email 410, sent by the user of the first client device. For example, the user of the second client device 400 may prefer to leverage the ask button, such as the ask button 216 (shown in FIG. 2) to directly solicit feedback from other recipients of the mutual introduction email, the email 410. For example, FIG. 4B depicts the example client device and email client application of FIG. 4A, the email client application displaying a graphical user interface configured to solicit user input leveraged to generate an actionable serialized object to embed into another email prior to sending.

More specifically, the second client device 400, executing the client application discussed above with reference to FIG. 4, can generate an overlaid graphical user interface labeled in the figure as the graphical user interface 418. The graphical user interface 418 can be configured to solicit and receive input from the user of the second client device 400, such as options for meeting with another recipient of the email 410. More particularly, the graphical user interface 418 can include a survey data entry area 420 that can be leveraged by the user of the second client device 400 to add multiple options. As the user adds another option, the user may press an add button 422 to signal that the user's input with respect to the most recently entered option is complete. Once the user has added all relevant or desired options, the user may press a send button 424 to generate an email 416 directed to other recipients of the original message, the email 410. In many embodiments survey items can also be associated with particular formats or display preferences. For example, a "positive response" to a survey question may be highlighted or shown in a green color, whereas a "negative response" may be shown in a red color. In other cases, a survey may request information related to approving expenses; high value approvals may be shown alongside several sequential currency icons or glyphs and low value approvals may be shown alongside fewer sequential currency icons or glyphs. In this example, different shades of green, or a graduated scale from green to red, may be used to visually emphasize difference between selectable options. More generally, it may be appreciated that formatting options may be encoded into and/or included within an embedded serialized object, such as described herein.

Figure 5:
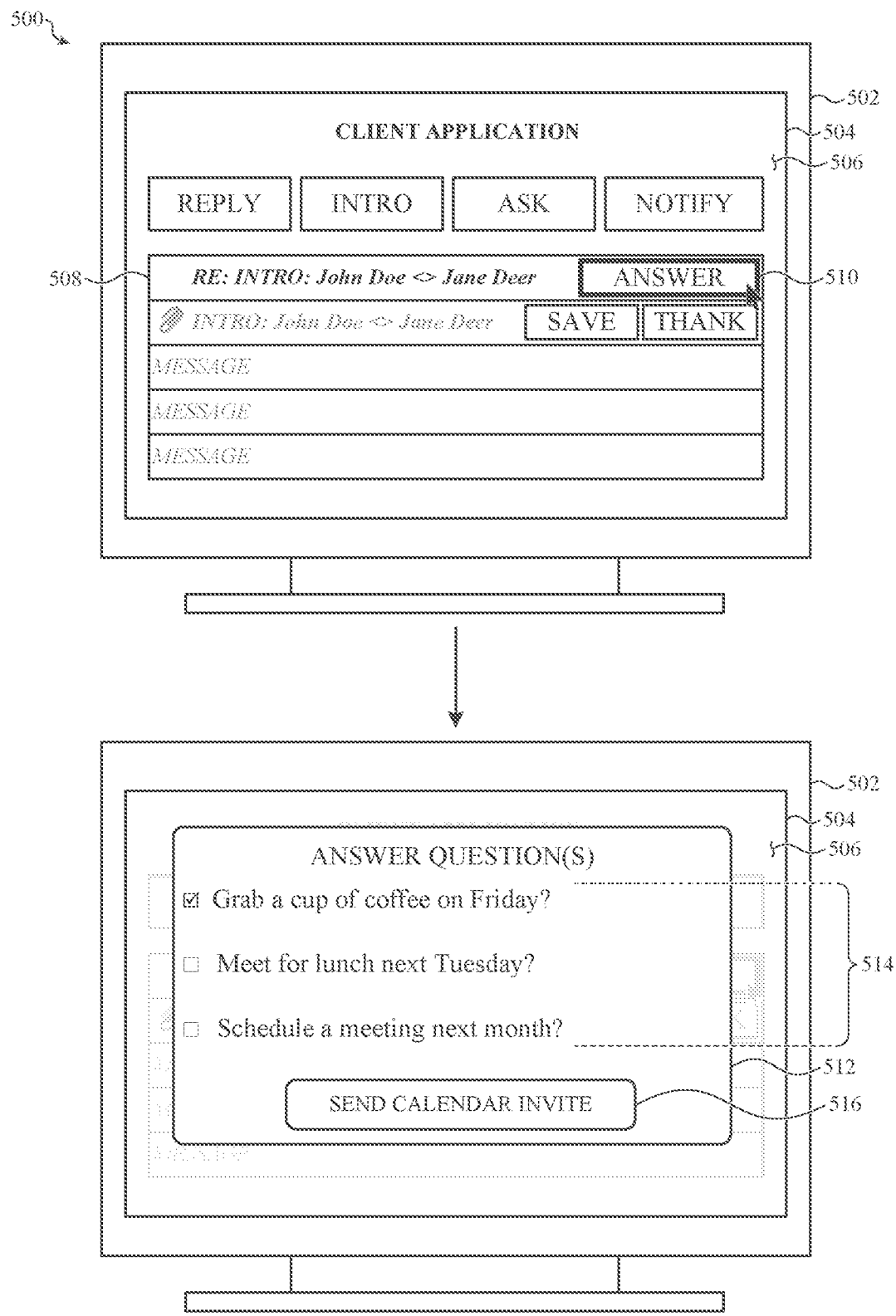
FIG. 5 depicts yet another client device executing an instance of an email client application having received the email of FIG. 4B and, in response, displaying a graphical user interface defined by the actionable serialized object.

As with other embodiments described herein the message 426 can include an actionable serialized object that informs a recipient client application that the options selected by the user of the second client device 400 should be displayed as a selectable list, and not as a standard email message. For example, FIG. 5 depicts yet another client device, a third client device 500, executing an instance of an email client application having received the email 426 of FIG. 4B (and the email 308 of FIG. 3) and, in response, displaying a graphical user interface defined by the actionable serialized object.

More specifically, the third client device 500, as with other embodiments described herein, can include a housing 502 enclosing a display 504 that, in turn, renders a graphical user interface. The graphical user interface 506 can be defined, at least in part by a client application, such as described above, that is configured to receive and generate emails. In this example, the third client device, and in particular, the client application instance executing on the third client device 500 receives and displays in a message list the email 308 sent from the first client device 200 (see, e.g., FIG. 3) and the email 426 send from the second client device 400. In particular, the email 426 received from the second client device 400 is identified as the email 508. As with other embodiments described herein the client application of the third client device 500 can be configured to extract an actionable serialized object from the email 308 sent from the first client device and, in response generate two buttons as shown (see also FIG. 4A). In addition, the client application of the third client device 500 can be configured to extract another actionable serialized object from the email 508 that defines a different graphical user interface modification. In particular, the email 508 can include an actionable serialized object that causes the third client device 508—and in particular the client application instance of the third client device 508 to render an answer button 510. The answer button 510, when selected by a user of the third client device renders a supplemental graphical user interface 512 that includes a survey response area 514, presenting options for response as defined in the actionable serialized object of the email 508. After selecting an appropriate option, the user of the third client device 500 can operate a button 516 that, according to the actionable serialized object of the email 508, returns a calendar invite to the sender of the email 508, the user of the second client device (see, e.g., FIG. 4B).

Once the response email to the survey is selected by the user of the third client device 500, the client application of that device generates a response email that, in turn, includes an actionable serialized object. In this case, the actionable serialized object may include an indication that the user of the third client device 500 has selected a particular option presented by the user of the second client device 400. More particularly, FIG. 6A the second client device 400 having received the response email 600 from the third client device 500 (see, e.g., FIG. 5). An actionable serialized object can be extracted by the client application of the second client device 400 and can cause that application to display a graphical user interface indicator 602 clearly showing which option was selected by the user of the third client deice 500. In many cases, the graphical user interface indicator 602 may present only a portion of the option selected by the user of the third client device 500, such as "Coffee" in place of "Meet for Coffee."

Figure 6A:
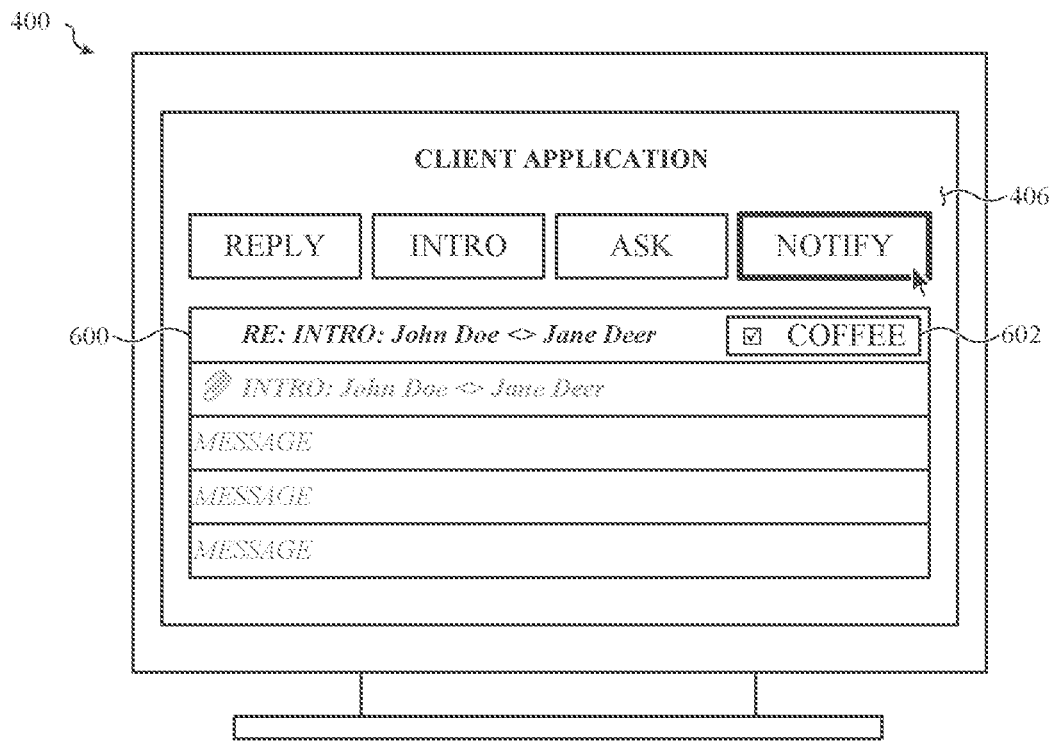
FIG. 6A depicts the example client device and email client application of FIG. 4A, the email client application having received the email of FIG. 5 and, in response, generating an automated reply email with an actionable serialized object defining how the automated replay should be displayed.
Figure 6B:
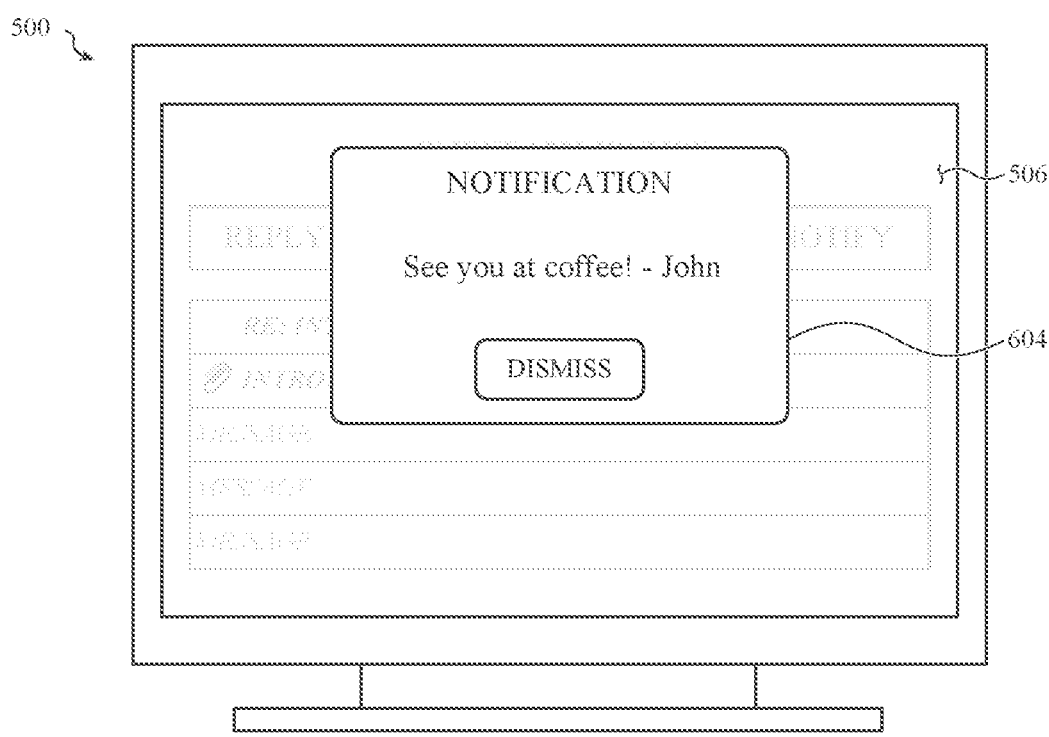
FIG. 6B depicts the example client device and email client application of FIG. 5, the email client application having received the email of FIG. 6A and, in response, displaying a notification according to the actionable serialized object.

After having received the response email 600 from the third client device 500, the user of the second client device may desire to simply notify the user of the third client device 500 that the user's selection was received. This action, as described above, can be performed by leveraging actionable serialized objects as described herein. In particular, the user of the second client device 400 can select a notify button presented in the graphical user interface 406. The notify button can automatically generate an email, including an actionable serialized object defining that the message should be shown only as a notification, and send that email to the user of the third client device 500. FIG. 6B depicts the third client device 500, hiding the message from a message list of the graphical user interface 506, and instead presenting only a notification 604.

These foregoing embodiments depicted in FIGS. 2-6 Band the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 7:
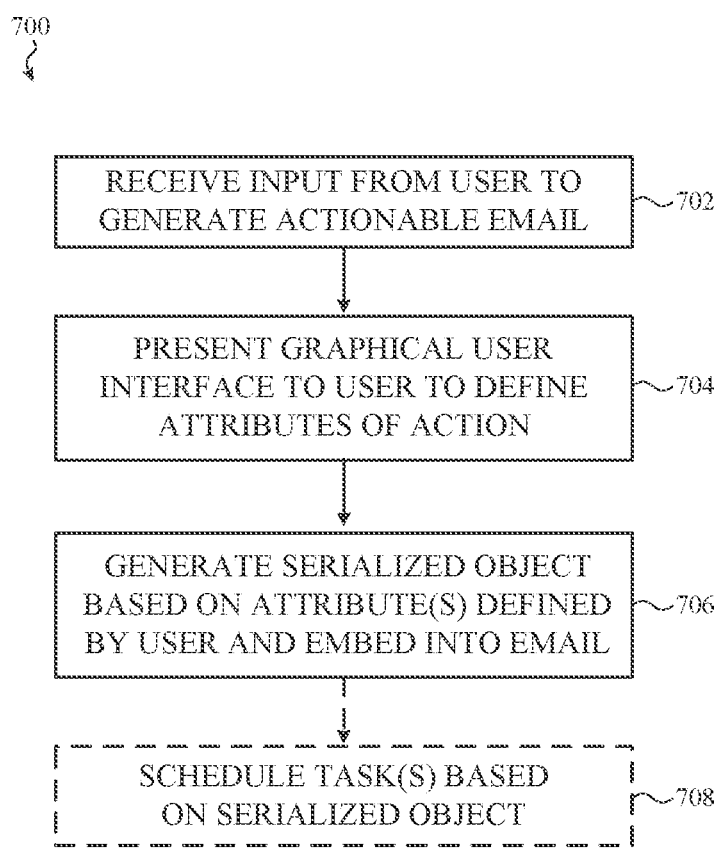
FIG. 7 is a flowchart depicting example operations of a method of embedding an actionable serialized object into an email, such as described herein.

FIG. 7 is a flowchart depicting example operations of a method of embedding an actionable serialized object into an email, such as described herein.

As with other embodiments described herein, the method can be performed in whole or in part by an instance of a client application executing on a client device. In particular, the method can be performed by one or more hardware resources of that client device, such as a processor and/or a memory. In particular implementations, a processor of the client device can be configured to access a working and/or persistent memory to obtain executable instructions or binary files that, when executed by the processor, instantiate at least a portion of the client application. The client application may be an email client application, such as described above, that is configured to receive email and send email. In addition, the client application instance may be configured to generate and/or extract one or more actionable serialized objects from email messages.

The instance can be configured to extract an actionable serialized object using any suitable method or combination of methods. In many embodiments, a serialized object is enclosed between custom tags within a document object model of an HTML-formatted email message body. In other examples. For example, the actionable serialized object may be a JSON object and/or Javascript function.

In many cases, the instance may be configured to execute a portion of the serialized object with an interpreter or compiler separate from the instance itself. In other cases, the serialized object(s) can include object data and/or data fields that can be extracted and/or typecast as particular variables or variable types.

Actionable serialized objects can be of any suitable object depth or tree structure; a flat object with a single attribute or single set of attributes distributed or arranged in key-value pairs is neither preferred nor implied.

In further embodiments, the instance can be configured to instruct a third party application or third party server, whether local or remote, to perform at least a portion of a task defined by an actionable serialized object.

In particular, the method 700 includes operation 702 at which input is received from a user to generate an actionable email, or as referred to herein, an email including an embedded/actionable serialized object. The method advances to operation 704 at which a graphical user interface is presented to that user that solicits input from the user to select one or more properties of the action(s) to be associated with the actionable email. Examples include, but are not limited to: recipients of the associated email; a subject of the associated email; body content of the associated email; a notification preference; and so on.

The method 700 advances to operation 706 at which the instance, or another software process or hardware mechanism, generates an embed serialized object (also referred to as an "embedded serialized object") based on the attributes selected by the user at operation 704. Once generated, the serialized object can be embedded into a header or other portion of a draft email.

Finally, the method 700 optionally advances to 708 at which one or more tasks can be scheduled based, at least in part, on the input received from the user. Example tasks include, but are not limited to: scheduling a follow-up message; adding a calendar event; adding a task; providing input to one or more collaboration tools, such as a project tracking application; accessing third party data to generate a follow-up email or reminder; and so on.

Figure 8:
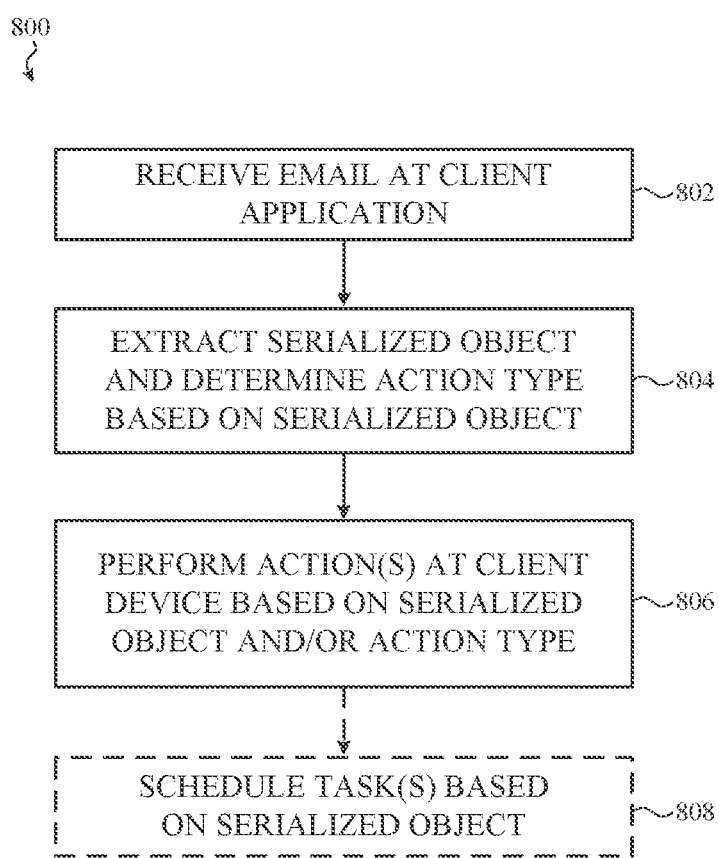
FIG. 8 is a flowchart depicting example operations of a method of performing one or more actions in response to receiving an email including an actionable serialized object, such as described herein.

FIG. 8 is a flowchart depicting example operations of a method of performing one or more actions in response to receiving an email including an actionable serialized object, such as described herein. The method can be performed by any suitable hardware or software combination, such as described above with reference to FIG. 7; this description and its various alternative constructions are not repeated.

The method 800 includes operation 802 at which an email is received at a client application. Thereafter, advancing to operation 804, the client application can extract an actionable serialized object, also referred to as an "embed serialized object." The client application can be configured to extract eh serialized object from any suitable portion of the email, including the email body, the email subject line, the email headers, and so on. In some examples, portions of a serialized object may be found in different portions of an email; in other cases multiple serialized objects can be embedded. After extracting a serialized object, the method 800 can advance to determine one or more action types, and/or one or more action attributes as defined in the actionable serialized object.

The method 800 thereafter advances to operation 806 at which one or more actions can be performed based on the information extracted and/or determined at operation 804. Finally, the method 800 optionally advances to 808 at which one or more tasks can be scheduled based, at least in part, on the input received from the user. Example tasks include, but are not limited to: scheduling a follow-up message; adding a calendar event; adding a task; providing input to one or more collaboration tools, such as a project tracking application; accessing third party data to generate a follow-up email or reminder; and so on.

Figure 9:
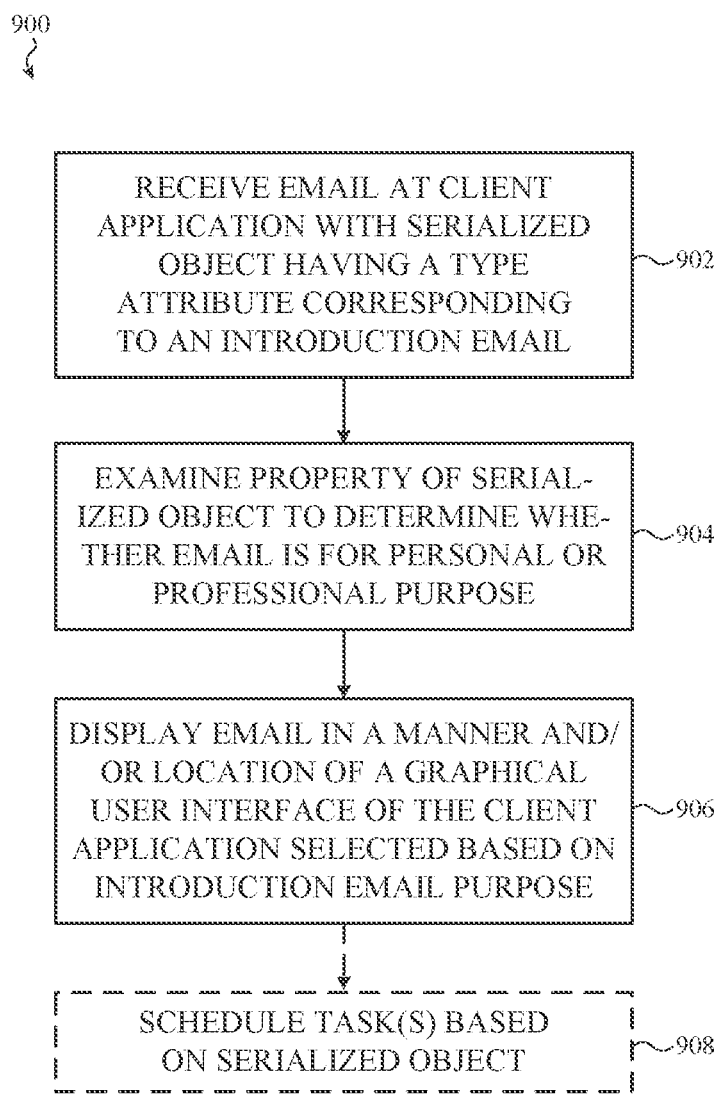
FIG. 9 is a flowchart depicting an example operation of a method of performing one or more actions in response to receiving an email including an actionable serialized object, such as described herein.

FIG. 9 is a flowchart depicting an example operation of a method of performing one or more actions in response to receiving an email including an actionable serialized object, such as described herein. The method can be performed by any suitable hardware or software combination, such as described above with reference to FIG. 7; this description and its various alternative constructions are not repeated.

The method 900 includes operation 902 at which an email is received at an email client. The email received can include an actionable serialized object having an action type associated with an introduction email.

The method 900 thereafter advances to operation 904, at which one or more properties or attributes of the serialized object embedded in the message received at operation 902 can be examined. For example, in one embodiment, the method may determine whether the introduction email is intended for a personal or professional purpose. In this example, a key or data item within the actionable serialized object may identify whether the introduction email is intended for a professional or personal purpose. In other examples, semantic processing, natural language processing, and/or sentiment analysis can be leveraged for this determination.

The method next advances to operation 906 at which the received email is displayed in a particular manner (e.g., in a particular location) based on the introduction email purpose. As a result of this construction, introduction emails are substantially more likely to be acted upon as the introduction email is unlikely to be lost among a long message list of unrelated messages.

Finally, as described in reference to other methods presented herein, the method 900 optionally advances to 908 at which one or more tasks can be scheduled based, at least in part, on the input received from the user. Example tasks include, but are not limited to: scheduling a follow-up message; adding a calendar event; adding a task; providing input to one or more collaboration tools, such as a project tracking application; accessing third party data to generate a follow-up email or reminder; and so on.

Figure 10:
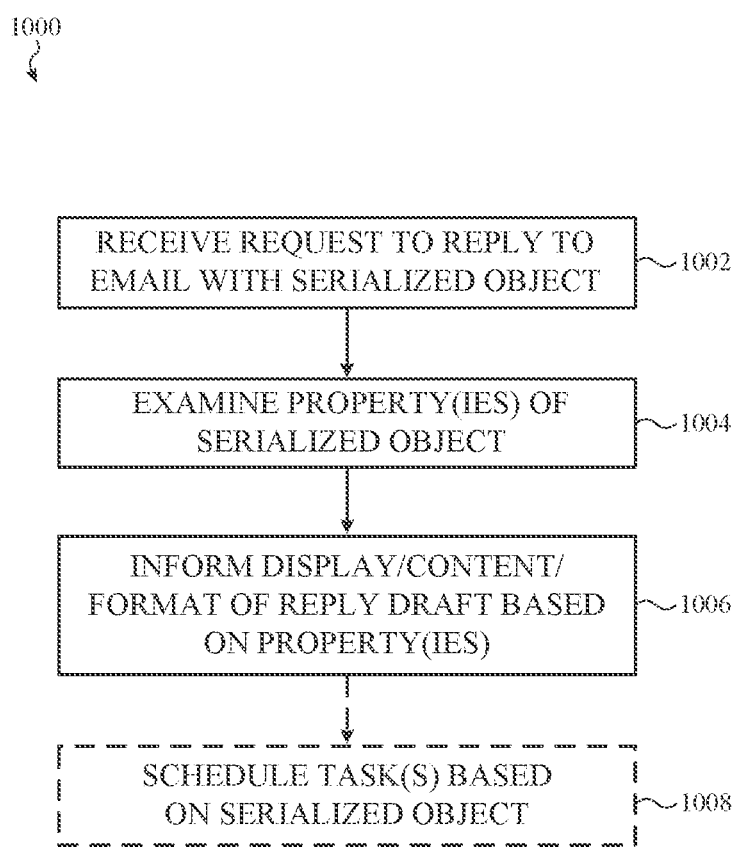
FIG. 10 is a flowchart depicting an example operation of a method of performing one or more actions in response to receiving an email including an actionable serialized object, such as described herein.

FIG. 10 is a flowchart depicting an example operation of a method of performing one or more actions in response to receiving an email including an actionable serialized object, such as described herein. The method can be performed by any suitable hardware or software combination, such as described above with reference to FIG. 7; this description and its various alternative constructions are not repeated.

The method 1000 includes operation 1002 in which a request to reply to a message including an actionable serialized object is received. Next at operation 1004, one or more properties of the embedded serialized object are examined. Next, at operation 1006, the reply message—or more precisely a draft email generated to reply to the message—may be modified based, at least in part, on the embed serialized object. For example, the embed serialized object may define that all replies should be directed to BCC and not to a CC line. In another example, the embed serialized object may define that all replies to the sender should themselves include an actionable serialized object to cause the sender's email client to display the reply message as a notification. These examples are not exhaustive, and other examples are possible.

Finally, as described in reference to other methods presented herein, the method 1000 optionally advances to 1008 at which one or more tasks can be scheduled based, at least in part, on the input received from the user. Example tasks include, but are not limited to: scheduling a follow-up message; adding a calendar event; adding a task; providing input to one or more collaboration tools, such as a project tracking application; accessing third party data to generate a follow-up email or reminder; and so on.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

Example computing resources or appliances that may be configured to receive email and/or send email as described herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:

1. A client device configured to communicably couple to an email server, the client device comprising:
   a display configured to render a first graphical user interface;
   a memory storing executable instructions; and
   a processor configured access the memory and to execute the executable instructions to instantiate a client application, the client application configured to perform the operations of:
      receive a first user input from a user, the first user input comprising selection of a message displayed in a message list;
      in response to the first user input, generate a second graphical user interface to solicit a second user input from the user, the second user input comprising a selection indicating that a reply from the user to the message will be displayed as a notification at a recipient client application and suppressed from a recipient message list at the recipient client application;
      in response to the second user input, generate a serialized object based on the second user input and the first user input;
      select a template from a set of email templates;
      populate the selected template based on the second user input;
      embed the serialized object into the populated selected template; and
      send the populated email template with the embedded serialized object to the email server.

2. The client device of claim 1, wherein:
   the client application is a first client application; and
   the serialized object is configured to cause a second client application associated with a recipient of the populated email template to automatically perform an action defined by the serialized object.

3. The client device of claim 1, wherein the action comprises one of:
  communicably coupling the first client application to the second client application;
  automatically sending a reply email from the second client application to the first client application; or
  displaying a notification by the second client application and suppressing display of the populated email template in a message list of the second client application.

4. The client device of claim 1, wherein the serialized object is embedded in an HTML body of the template.

5. The client device of claim 4, wherein the serialized object is enclosed in specified HTML tags.

6. The client device of claim 1, further comprising serializing the serialized object as a string prior to embedding the serialized object into the populated email template.

7. The client device of claim 1, wherein sending the populated email template with the embedded serialized object to the email server occurs automatically in response to the second user input.

8. A method of facilitating communication from a first client device to a second client device via email, the method comprising:
  receiving, at the second client device from an email server, an email sent to the email server by a first client device, the email comprising a first serialized object hidden from a user of the second client device;
  suppressing display of the email at the second client device upon determining that the email contains the first embedded serialized object;
  extracting the serialized object from the email at the second client device;
  extract an executable instruction from the first serialized object at the second client device;
  execute the executable instruction at the second client device to generate a result;
  generate, at the second client device, a second serialized object comprising the result;
  embedding the second serialized object into a reply to the email; and
  sending the reply to the email server.

9. The method of claim 8, wherein the executable instruction causes the second client device to render a graphical user interface defined at least in part by the serialized object.

10. The method of claim 8, wherein the executable instruction causes the second client device to communicably couple to the first client device.

11. The method of claim 8, wherein the serialized object is embedded in one of a header of the email or a body of the email.

12. The method of claim 8, wherein the executable instruction causes the second client device to sample a sensor of the second client device to generate the result.

13. The method of claim 12, wherein the second serialized object is defined at least in part by the first serialized object, the second serialized object comprising a second executable instruction that causes the first client device to suppress display of the reply and to generate a notification at the first client device.

* * * * *